(12) United States Patent
De' Longhi et al.

(10) Patent No.: US 11,073,813 B2
(45) Date of Patent: Jul. 27, 2021

(54) SELECTOR DEVICE FOR A DOMESTIC APPLIANCE, AND DOMESTIC APPLIANCE COMPRISING SAID SELECTOR DEVICE

(71) Applicant: DE' LONGHI APPLIANCES S.R.L. CON UNICO SOCIO, Treviso (IT)

(72) Inventors: Giuseppe De' Longhi, Treviso (IT); Luciano Scian, Treviso (IT)

(73) Assignee: DE' LONGHI APPLIANCES S.R.L. CON UNICO SOCIO, Treviso (IT)

( * ) Notice: Subject to any disclaimer, the term of this patent is extended or adjusted under 35 U.S.C. 154(b) by 8 days.

(21) Appl. No.: 16/611,184

(22) PCT Filed: Apr. 26, 2018

(86) PCT No.: PCT/IT2018/050075
§ 371 (c)(1),
(2) Date: Nov. 5, 2019

(87) PCT Pub. No.: WO2018/203356
PCT Pub. Date: Nov. 8, 2018

(65) Prior Publication Data
US 2020/0192322 A1 Jun. 18, 2020

(30) Foreign Application Priority Data
May 5, 2017 (IT) .......................... 102017000048993

(51) Int. Cl.
| G05B 19/10 | (2006.01) |
| F21V 23/04 | (2006.01) |
| F21V 8/00 | (2006.01) |
| G05G 1/02 | (2006.01) |
| G05G 1/08 | (2006.01) |

(Continued)

(52) U.S. Cl.
CPC .............. G05B 19/10 (2013.01); A47J 42/44 (2013.01); F21V 23/04 (2013.01); G02B 6/0001 (2013.01);
(Continued)

(58) Field of Classification Search
CPC ........ G02B 6/0001; G05G 1/105; G05G 1/02; G05G 1/08; H01H 2219/0622; H01H 2219/044; H01H 2219/06
(Continued)

(56) References Cited

U.S. PATENT DOCUMENTS 6,356,394 B1 * 3/2002 Glienicke ................ B60Q 3/64
359/641
6,824,288 B2 * 11/2004 Prindle ................ H01H 13/702
200/314
(Continued)

FOREIGN PATENT DOCUMENTS

DE  10 2006 059725 A1  6/2008
EP     2 518 591 A2    10/2012

OTHER PUBLICATIONS

International Search Report and Written Opinion for PCT/IT2018/050075, dated Jul. 20, 2018.

*Primary Examiner* — William N Harris
(74) *Attorney, Agent, or Firm* — Marshall, Gerstein & Borun LLP

(57) ABSTRACT

A selector device for a domestic appliance includes selection means to select a determinate program and/or function of the domestic appliance; drive means able to switch the domestic appliance on or off and positioned in the selection means; and lighting means, suitable to signal that the apparatus is switched on or off and associated with the selection means and with the drive means.

7 Claims, 2 Drawing Sheets

(51) Int. Cl.
  *G05G 1/10*      (2006.01)
  *G05G 9/04*      (2006.01)
  *F21Y 115/10*    (2016.01)
  *A47J 42/44*     (2006.01)

(52) U.S. Cl.
  CPC ............... *G05G 1/02* (2013.01); *G05G 1/08* (2013.01); *G05G 1/105* (2013.01); *G05G 9/04* (2013.01); *F21Y 2115/10* (2016.08)

(58) Field of Classification Search
  USPC ..................................................... 362/23.05
  See application file for complete search history.

(56) References Cited

U.S. PATENT DOCUMENTS

| | | | |
|---|---|---|---|
| 7,339,128 B2 * | 3/2008 | Yen ................. | H05B 45/00 200/314 |
| 7,692,111 B1 * | 4/2010 | Rosing .............. | H01H 13/83 200/310 |
| 9,076,610 B2 * | 7/2015 | Murzyn ............. | H01H 19/025 |
| 10,345,514 B2 * | 7/2019 | Kozinski ........... | G02B 6/0095 |
| 2005/0168966 A1 * | 8/2005 | Maeda ............... | H01H 25/041 362/23.05 |
| 2006/0139907 A1 | 6/2006 | Yen | |
| 2007/0195513 A1 * | 8/2007 | Nishiyama ......... | G05G 1/105 362/23.21 |
| 2007/0253185 A1 * | 11/2007 | Palacio ............. | G01D 11/28 362/97.1 |
| 2015/0162148 A1 | 6/2015 | Murzyn et al. | |
| 2016/0161105 A1 * | 6/2016 | Cheng ............... | F21V 33/00 362/23.05 |
| 2017/0262009 A1 * | 9/2017 | Peng ................. | G05G 9/047 |

* cited by examiner

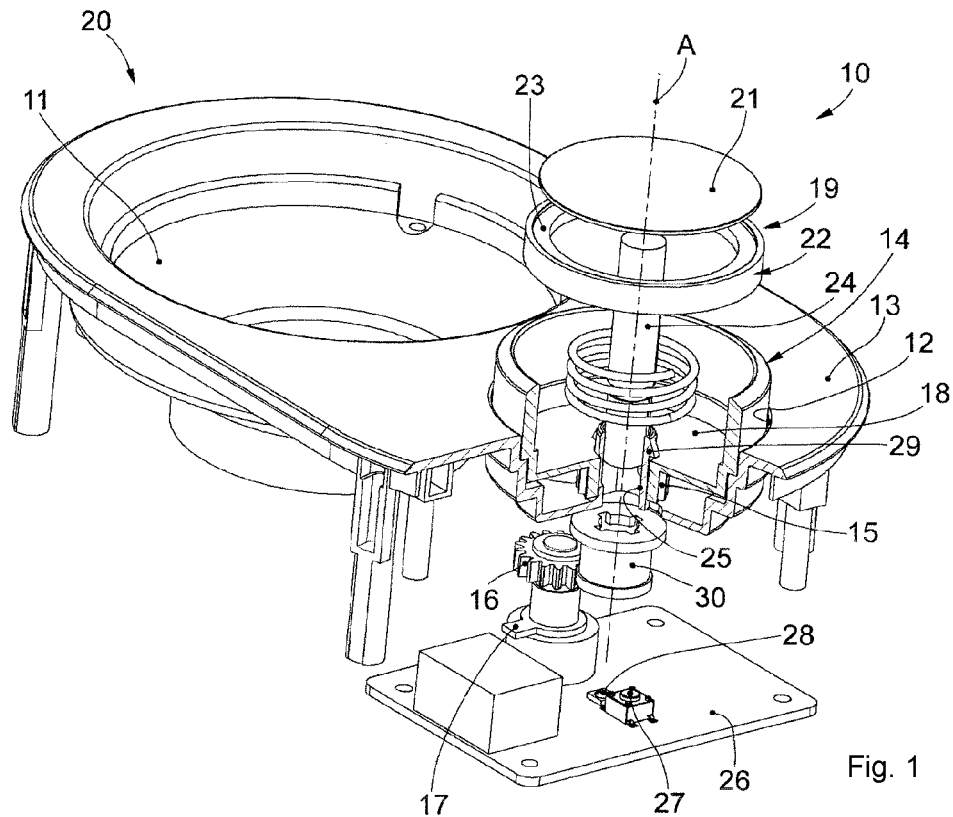
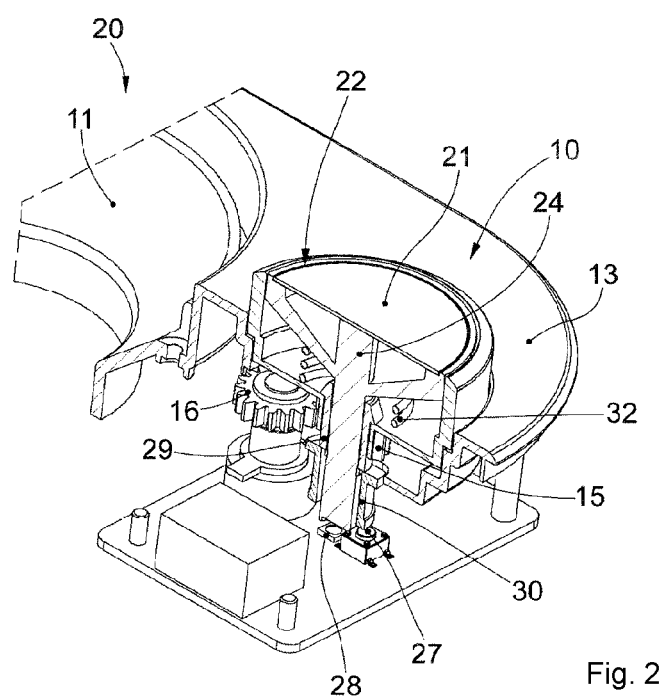

SELECTOR DEVICE FOR A DOMESTIC APPLIANCE, AND DOMESTIC APPLIANCE COMPRISING SAID SELECTOR DEVICE

FIELD OF THE INVENTION

The present invention concerns a selector device for a domestic appliance, and a domestic appliance equipped with said selector device.

BACKGROUND OF THE INVENTION

As is known, domestic appliances, such as for example coffee grinders, food shredders or other devices, are provided with selector devices, such as devices for selecting the various functions and/or the various functioning programs. An example of selector devices is described, for example, in the article "OKO-LAVAMAT 620", XP055444235, published on 14 Mar. 2014.

In the case of a coffee grinder, for example, the selector device can be used to select the quantity of coffee beans to be ground and hence the quantity of coffee powder to be obtained.

Known selector devices can consist, for example, of knobs rotatable with respect to a fixed dashboard on which indicator elements are located, to indicate the selected function or program.

Once the function or program has been selected by means of the knob, the domestic appliance is started by means of an additional push-button or drive button which is generally in a remote position or in any case separate from the knob.

The button to drive the domestic appliance can be associated with lighting means, such as light bulbs or other, that signal the starting or stopping of the domestic appliance.

Current selection knobs to select the programs or functions of domestic appliances and the current drive buttons of domestic appliances therefore have obvious limits of efficiency and functionality, since the selection of the function, the drive of the domestic appliance and the signaling of the drive of the domestic appliance are generally characteristics that are unconstrained and disassociated from one another.

Other limitations and disadvantages of conventional solutions and technologies will be clear to a person of skill after reading the remaining part of the present description with reference to the drawings and the description of the embodiments that follow, although it is clear that the description of the state of the art connected to the present description must not be considered an admission that what is described here is already known from the state of the prior art.

There is therefore a need to perfect a selector device for a domestic appliance which can overcome at least one of the disadvantages of the state of the art.

One purpose of the present invention is therefore to provide a selector device for a domestic appliance by means of which it is possible, quickly and reliably, to select a functioning program of the domestic appliance and/or a certain function of the domestic appliance, to drive and stop the domestic appliance and to signal appropriately and effectively the successful drive of the domestic appliance.

Another purpose of the present invention is to provide a selector device which is practical, compact and can be associated with any type of domestic appliance, and which therefore is equipped with means to select, activate and signal, by means of suitable lighting means, a determinate program or function of the domestic appliance.

The Applicant has devised, tested and embodied the present invention to overcome the shortcomings of the state of the art and to obtain these and other purposes and advantages.

SUMMARY OF THE INVENTION

The present invention is set forth and characterized in the independent claims, while the dependent claims describe other characteristics of the invention or variants to the main inventive idea.

In accordance with the above purposes, a selector device for a domestic appliance, according to a characteristic aspect of the invention, comprises: selection means to select a determinate program and/or function of the domestic appliance; drive means able to switch the domestic appliance on or off and positioned in the selection means; and lighting means, suitable to signal that the apparatus is switched on or off and associated with the selection means and with the drive means.

According to another aspect of the invention, the selection means comprise at least a rotatable knob to select a function and/or functioning program of the domestic appliance; the drive means comprise at least a drive button of the domestic appliance positioned in the knob and mobile from at least a first active position to at least a second inactive position; the selector device comprising at least a diffusion element of the light emitted by the lighting means, in which the diffusion element is positioned between the button and the knob and configured to deliver at least a light beam emitted by the lighting means at least between the knob and the button when the button is activated or de-activated.

The light diffusion element is preferably coaxial to the knob.

The button can be translated upward or downward and positioned coaxially to the knob.

The light diffusion element can comprise a light guide ring positioned in the knob, so as to form at least a luminous crown between the button and the knob.

The light guide ring can be housed inside a seating made in the knob and can comprise a shank able to pass through a hole made at the base of the seating of the knob and able to cooperate with the means for starting the domestic appliance and switching on the lighting means.

The light guide ring can also comprise a light guide block positioned around the shank and able to cooperate with the means for starting the domestic appliance and switching on the lighting means.

The light guide ring can be positioned in a central position with respect to the lighting means.

The drive button can comprise at least a lid positionable on a peripheral seating of the light guide ring.

The invention also concerns a domestic appliance, comprising a selector device as described above.

These and other aspects, characteristics and advantages of the present disclosure will be better understood with reference to the following description, drawings and attached claims. The drawings, which are integrated and form part of the present description, show some forms of embodiment of the present invention, and together with the description, are intended to describe the principles of the disclosure.

The various aspects and characteristics described in the present description can be applied individually where possible. These individual aspects, for example aspects and characteristics described in the specification or in the attached dependent claims, can be the object of divisional applications.

It is understood that any aspect or characteristic that is discovered, during the patenting process, to be already known, shall not be claimed and shall be the object of a disclaimer.

BRIEF DESCRIPTION OF THE DRAWINGS

These and other characteristics of the present invention will become apparent from the following description of some embodiments, given as a non-restrictive example with reference to the attached drawings wherein:

FIG. 1 is a three-dimensional exploded view of a selector device for a domestic appliance according to the invention;

FIG. 2 is a three-dimensional view and partly in section of the device of FIG. 1 in an assembled configuration;

To facilitate comprehension, the same reference numbers have been used, where possible, to identify identical common elements in the drawings. It is understood that elements and characteristics of one embodiment can conveniently be incorporated into other embodiments without further clarifications.

DETAILED DESCRIPTION OF SOME EMBODIMENTS

Figure 4:
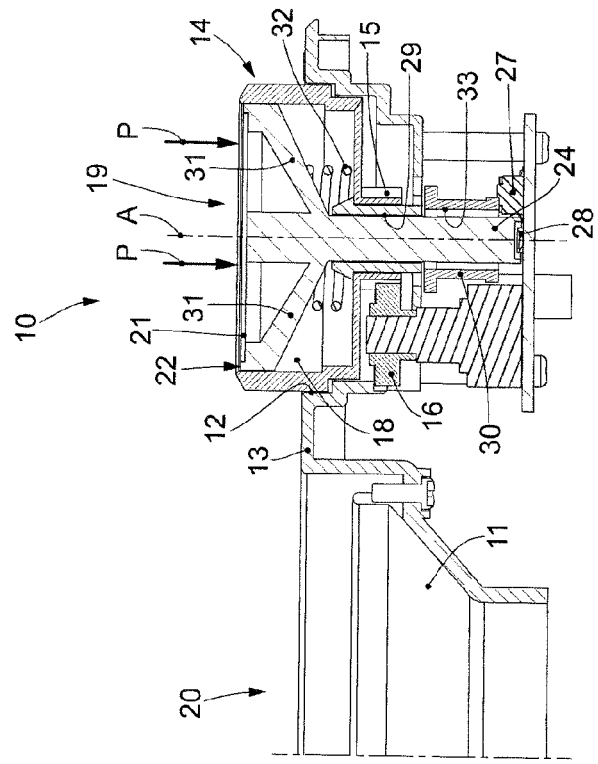
FIG. 4 is a lateral elevated view and in section of the present selector device in a second position of switching on the domestic appliance.

We will now refer in detail to the various embodiments of the present invention, of which one or more examples are shown in the attached drawings. Each example is supplied by way of illustration of the invention and shall not be understood as a limitation thereof. For example, the characteristics shown or described insomuch as they are part of one embodiment can be adopted on, or in association with, other embodiments to produce another embodiment. It is understood that the present invention shall include all such modifications and variants.

Before describing these embodiments, we must also clarify that the present description is not limited in its application to details of the construction and disposition of the components as described in the following description using the attached drawings. The present description can provide other embodiments and can be obtained or executed in various other ways. We must also clarify that the phraseology and terminology used here is for the purposes of description only, and cannot be considered as limitative.

With reference to the attached drawings, in particular FIGS. 1 and 2, the reference number 10 indicates a selector device associated with a domestic appliance, for example a coffee grinder 20.

Although in the following description reference is made to a coffee grinder, it is understood that the selector device 10 according to the invention can be applied to any domestic appliance whatsoever, both for the kitchen and for other kinds.

In the example case of a coffee grinder 20, it comprises a hopper 11 where the coffee beans to be ground are housed.

In the hopper 11, typically near the bottom, means for grinding the coffee beans will be positioned.

The selector device 10 can be housed in a suitable seating 12 made on a dashboard 13 of the coffee grinder 20.

The selector device comprises a knob 14, or other selection mean, which can be rotated around an axis A, in order to select the desired program or function of the coffee grinder 20.

For example, it can be hypothesized that, by means of the knob 14, it is possible to select the quantity of coffee to be ground in the hopper 11 in order to obtain a certain quantity of coffee powder, for example to fill a given container of coffee powder, to prepare a certain number of cups of coffee, or other.

In order to select the program or function of the coffee grinder 20, the knob 14 comprises a toothed portion 15 able to engage in a toothed wheel 16, the axis of rotation of which is preferably parallel to the axis of rotation A of the knob 14.

The toothed wheel 16, in a known manner, is mounted on an adjustment trimmer 17, which is associated with an electronic board to manage the functioning of the coffee grinder 20.

The rotation of the knob 14, and therefore of its toothed portion 15, determines the rotation of the toothed wheel 16 and therefore the selection of the desired program or function of the coffee grinder 20.

In this regard, on the dashboard 13 position indicators of the knob 14 will be provided and therefore indicate the selected program or function.

The knob 14 comprises internally a seating 18 in which a button 19 to drive the coffee grinder 20 is inserted.

The knob 14 can be made substantially in the shape of an annular crown, as shown by way of non-restrictive example.

The button 19 comprises a centrally disposed lid 21, for example made of chromium-plated plastic, steel or other metal or non-metal material having an adequate shine.

The lid 21 can have a circular shape, for example, as shown by way of non-restrictive example.

The button 19 comprises a light guide ring 22, or another mean or element to diffuse the light, for example made of transparent material.

The lid 21 is housed in a peripheral seating 23 made in the light guide ring 22.

The lid 21 and the light guide ring 22 are preferably coaxial with respect to the axis A.

Figure 3:
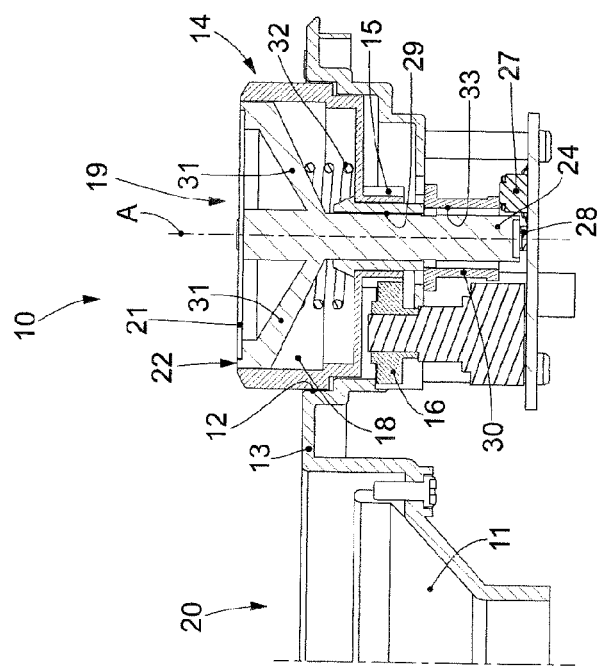
FIG. 3 is a lateral elevated view and in section of the present selector device in a first position of switching off the domestic appliance.

The light guide ring 22 is provided with a shank 24 and at least a radial portion 31, see FIGS. 3 and 4, connecting the shank 24 to the peripheral seating 23.

The lid 21 can be attached, by any known means, to the shank 24 of the button 19.

The shank 24 passes through a hole 25 made at the base of the knob 14 and comes close to a base support 26 of the selector device 10.

A button 27 to start the drive means of the coffee grinder 20, for example an electric motor, is positioned on the support 26.

The starting button 27 can determine, for example when it is pressed, the switching on of at least one LED 28, or other lighting means.

The LED 28 is advantageously in a centered position with respect to the light guide ring 22, for example positioned on the axis A, so as to form a uniform and well-diffused light ring through the light guide ring 22.

The button 27 is driven by means of a light guide block 30, or another block suitable for light diffusion and suitable to be translated downward by raising or pressing the button 19.

As can be seen for example in FIG. 3, an annular interspace 33 can be made between the light guide block 30 and the shank 24 of the light guide ring 22.

The light guide block 30 is preferably coaxial with the shank 24 of the light guide ring 22.

Between the shank 24 of the button 19 and the hole 25 of the knob 14 a guide element 29 is positioned, integral with the knob 14.

Between the light guide ring 22 and the base of the seating 18 inside the knob a spring 32 or other elastic mean is positioned.

The spring 32, or other elastic mean, can for example be provided to keep the button 19 at rest in an inactive position, or raised, and to be compressed when the button is activated, that is, pressed, to start the domestic appliance 20.

In operation therefore, the selector device 10 according to the invention allows, by rotating the knob 14 around the axis A, to select the desired program or function of the coffee grinder 20, for example it is possible to select different quantities of coffee to be ground as a function of the quantity of coffee powder to be obtained, or as a function of the number of cups of coffee to be prepared.

The function or program, as we said, is selected by rotating the knob 14 around the axis A and then by rotating the toothed wheel 16 with which the trimmer 17 is associated.

It can be hypothesized, for example, that on the dashboard 13 the number of cups of coffee to be obtained is indicated directly, so by choosing a certain number of cups of coffee by rotating the knob 14, the coffee grinder automatically grinds the necessary quantity of coffee beans and obtains the necessary quantity of coffee powder.

Once the function has been selected using the knob 14, the button 19 is pressed in direction P, see FIG. 4, and then the shank 24 is lowered so that the light guide block 30 drives the button 27 that switches on the coffee grinder 20.

From the comparison of FIG. 3 and FIG. 4, it can be appreciated that the button 19, in the active position of FIG. 4, is slightly lowered inside the knob 14, which remains fixed.

Substantially therefore, the drive button 19 can rise and lower along the axis A, while the knob 14 can rotate with respect to said axis A.

Switching on the coffee grinder 20 also causes the LED 28, or other lighting mean, to light up, the light of which will be diffused by the light guide ring 22 and will substantially give rise to a luminous ring between the knob 14 and the lid 21 of the button 19.

The lid 21 made of shiny material also reflects the light emitted by the LED 28, or in any case by the lighting means, thus increasing the intensity of the luminous ring.

The domestic appliance 20 with which the present selector device 10 is associated could naturally be any domestic appliance whatsoever which provides to operate according to different functioning modes, therefore with different programs and operating modes, for example any other food shredding or mincing device, such as a meat grinder, a blender, a food processor, a vegetable shredder or suchlike, or other kinds of domestic appliances, for example washing machines, dishwashers, or suchlike.

Advantageously, therefore, the present selector device 10 is equipped with both means to select the various programs or functions of the domestic appliance, for example the knob 14, and also start means, for example the button 19, suitable to switch the domestic appliance on and off, and positioned in said selection means.

Moreover, the selection means and the activation means are associated with lighting means, for example the LED 28, suitable to signal that the domestic appliance 20 is switched on or off.

The button 19 is also provided with a light guide ring 22 able to create a light ring between the knob 14 and the button 19, in order to signal, for example, that the domestic appliance 20 is switched on or off.

Moreover, since the LED 28, or other lighting mean, is located in a centered position with respect to the light guide ring 22, the light ring formed will have an optimum diffusion and intensity.

It is clear that modifications and/or additions of parts can be made to the selector device as described heretofore, without departing from the field and scope of the present invention.

It is also clear that, although the present invention has been described with reference to some specific examples, a person of skill in the art shall certainly be able to achieve many other equivalent forms of selector device, having the characteristics as set forth in the claims and hence all coming within the field of protection defined thereby.

In the following claims, the sole purpose of the references in brackets is to facilitate reading: they must not be considered as restrictive factors with regard to the field of protection claimed in the specific claims.

The invention claimed is:

1. A selector device for a domestic appliance, comprising: selection means to select a determinate program and/or function of the domestic appliance; drive means able to switch the domestic appliance on or off and positioned in said selection means; and lighting means, suitable to signal that the appliance is switched on or off and associated with said selection means and with said drive means, wherein said selection means comprise at least a rotatable knob which can be rotated around an axis to select a function and/or functioning program of the domestic appliance; said drive means comprise at least a drive button of the domestic appliance positioned in the knob which can rise and lower along said axis from at least a first active position to at least a second inactive position while said knob remains fixed; the selector device also comprising at least a light guide ring positioned between the button and the knob and configured to deliver a light beam emitted by said lighting means so as to form a luminous crown at least between said knob and said button when said button is activated or de-activated, wherein said light guide ring is housed inside a seating made in the knob and comprises a shank adapted to pass through a hole made at the base of said seating of the knob and configured to drive a button for starting the domestic appliance and switching on said lighting means and wherein said lighting means are positioned on said axis in a centered position with respect to the light guide ring so as to form a uniform and well-diffused light ring through said light guide ring.

2. The device as in claim 1, wherein said light guide ring is coaxial to said knob.

3. The device as in claim 1, wherein said button can be translated upward or downward and positioned coaxially to said knob.

4. The device as in claim 1, wherein said light guide ring comprises a light guide block positioned around said shank and adapted to cooperate with said button for starting the domestic appliance and switching on said lighting means.

5. The device as in claim 1, wherein said drive button comprises at least a lid positionable on a peripheral seating of said light guide ring, said lid being made of chromed plastic, steel or other metal or non-metal material suitable to reflect the light emitted by said lighting means.

6. The device as in claim 1, wherein said lighting means comprise at least a LED.

7. A domestic appliance, comprising the selector device of claim 1.

* * * * *